United States Patent [19]
Barton et al.

[11] 3,812,392
[45] May 21, 1974

[54] COMPOSITE ARMATURE CORE FOR DYNAMOELECTRIC MACHINE

[75] Inventors: Sterling C. Barton; Nickolas Schmitt, both of Scotia, N.Y.

[73] Assignee: General Electric Company, Schenectady, N.Y.

[22] Filed: Mar. 9, 1973

[21] Appl. No.: 339,580

[52] U.S. Cl.................... 310/259, 310/51, 310/216
[51] Int. Cl............................................. H02k 1/12
[58] Field of Search........................... 310/216–218, 310/42, 44, 51, 254, 259

[56] References Cited
UNITED STATES PATENTS

| | | | |
|---|---|---|---|
| 2,423,345 | 7/1947 | Roters............................. | 310/259 X |
| 3,459,981 | 8/1969 | Dotto.............................. | 310/254 X |
| 2,871,384 | 1/1959 | Gabriel........................... | 310/259 X |
| 1,367,298 | 2/1921 | Burke.............................. | 310/259 X |
| 2,774,000 | 12/1956 | Ross................................ | 310/259 X |
| 2,046,717 | 7/1936 | Bitter............................. | 310/259 UX |
| 2,792,511 | 5/1957 | Horstman....................... | 310/259 X |
| 1,809,197 | 6/1931 | Fendrich, Jr.................... | 310/216 |

Primary Examiner—J. D. Miller
Assistant Examiner—Mark O. Budd
Attorney, Agent, or Firm—John F. Ahern; James W. Mitchell

[57] ABSTRACT

In a laminated dynamoelectric machine armature core, grain-oriented material is used in the end sections and non-oriented material with a higher effective modulus of elasticity is used in the midsection. This permits reductions in radial vibrational deflections at the core midsection or alternatively permits reductions in overall core diameter without increasing vibrational deflections at the midsection.

3 Claims, 1 Drawing Figure

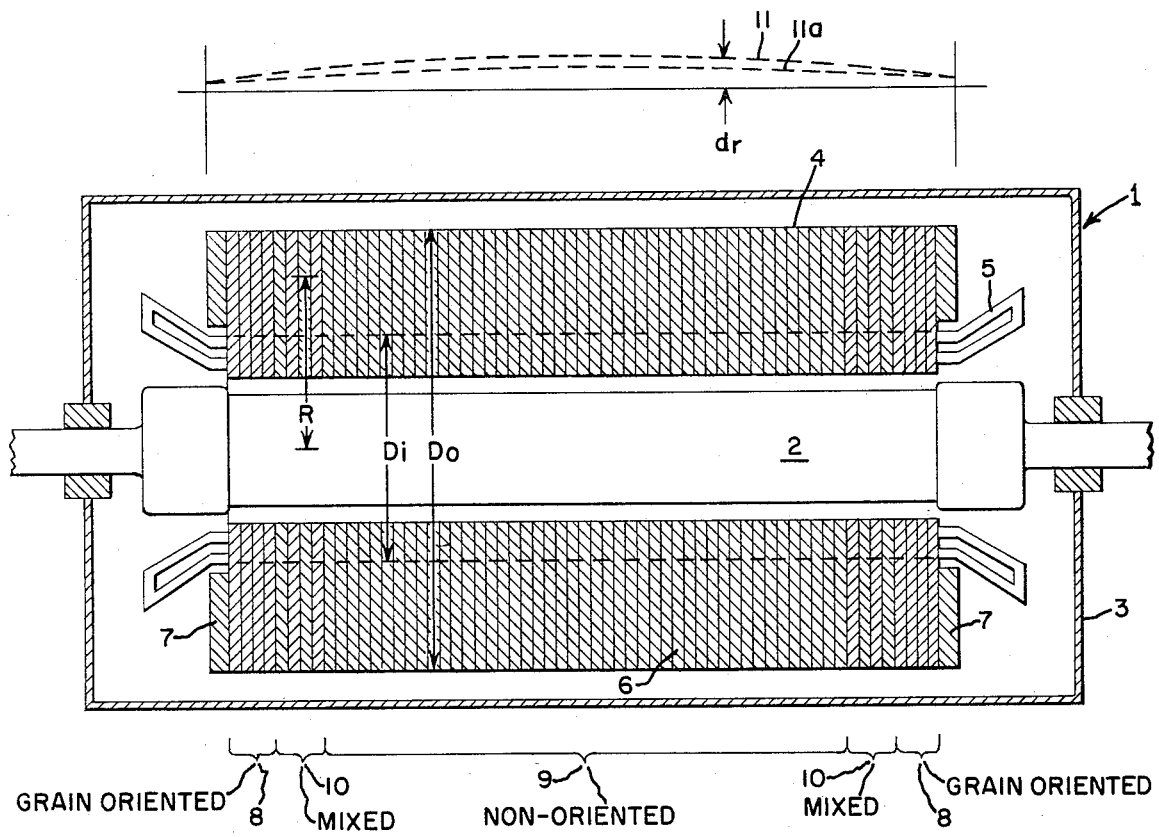

COMPOSITE ARMATURE CORE FOR DYNAMOELECTRIC MACHINE

BACKGROUND OF THE INVENTION

This invention relates generally to laminated armature core constructions for large dynamoelectric machines such as a two-pole, 3,600 rpm turbine-generator.

It is well known that the armature core of a generator vibrates radially at a frequency twice that of the speed of rotation of the two-pole field rotor. This is due to the magnetic field of the rotor bringing about a distortion of the stator into an elliptical shape which revolves in synchronism with the rotor.

A complete discussion of this phenomenon is found in a paper entitled "Suppression of Magnetic Vibration and Noise of Two-Pole Turbine-Generators" by A. L. Penniman, Jr. and H. D. Taylor, American Institute of Electrical Engineers Transactions, Volume 60, 1941 (AIEE Paper 41–39), which is incorporated herein by reference.

The amplitude of the radial deflections has a significant effect upon the design of the generator, affecting the manner of holding the core in its frame by spring mountings and other means. Radial deflections may be minimized by increasing the radial depth of the punchings thereby increasing the overall diameter of the core, but this adds to the cost of the generator and also creates shipping problems in very large machines. It is also known that the amplitude of the radial vibrational deflections are greater at the center of the dynamoelectric machine than at the ends. Hence, a means to decrease the overall core diameter without causing a commensurate increase in vibrational deflections at the core midsection would permit significant design benefits and cost savings.

It is also known that the punchings or laminations of a dynamoelectric machine armature core may be made of non-oriented material or of so-called grain-oriented material. The latter has a greater preference for flow of magnetic flux in one direction than it does in a direction perpendicular thereto. A dynamoelectric machine is constructed using the more expensive grain-oriented material when the optimum design is such that the electromagnetic design limits are reached before mechanical design limits on vibratory motion are reached.

Accordingly, one object of the present invention is to provide an improved armature core construction for a dynamoelectric machine which permits a reduction in the overall core diameter where mechanical limits but not magnetic limits have been reached without a commensurate increase in the amplitude of radial vibrational deflections at the core midsection.

Another object of the invention is to provide an improved dynamoelectric machine core construction which utilizes the beneficial qualities of grain-oriented material in the higher flux regions of the core while still permitting reductions in overall core diameter of a large dynamoelectric machine.

SUMMARY OF THE INVENTION

Briefly stated, the invention comprises a laminated dynamo-electric machine core with non-oriented material in its midsection and grain-oriented material in its end sections. The invention also contemplates transition sections containing mixed or interleaved laminations of grain-oriented and non-oriented material.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which the single FIGURE is a simplified cross section of a two-pole turbine-generator.

DESCRIPTION OF THE PREFERRED EMBODIMENT

A generator 1 includes a rotor 2 provided with a field winding and rotatably mounted in a frame 3. A stationary armature core 4 is provided with main armature windings 5 in longitudinal slots as is known in the art. Suitable provisions for cooling with gas or liquid (not shown) are normally provided.

The core 4 is held within frame 3 by one of many possible arrangements, typical constructions being shown in U.S. Pat. Nos. 2,199,351 or 2,554,226 both to H. D. Taylor and assigned to the present assignee, the aforesaid patents being incorporated herein by reference. Core 4 is conventionally comprised of pie-shaped and interleaved laminations or punchings 6 together making up a cylindrical member and held together at the ends by heavy steel clamping rings or flanges 7.

As described in the aforesaid AIEE Paper, core 4 acts as though it were a cylinder of great strength and stiffness, independent of the frame 3, even though the core is made up of separate lamination members. This cylinder can be thought of as having an outer diameter $D_o$ and an inner diameter $D_i$ (measured between the bottoms of the main winding slots). A formula for obtaining the stiffness of this core cylinder is adapted from well-known formulas for calculating the stiffness of a ring against elliptical distortions as follows:

$$S = K\,(EI/R^3)$$

where S is stiffness, E is the effective modulus of elasticity, I is the cross-sectional moment of inertia and R is the radius to the neutral axis.

Radial deflections having amplitudes $d_r$ are caused by the rotating magnetic field of rotor 2. This is indicated by an exaggerated dashed curved line 11 departing from a horizontal line indicating the position at rest. Deflection amplitudes $d_r$ are greater at the midpoint than at the ends of the core. This is due to the greater stiffness of the clamping rings 7, and their greater distance from the magnetic poles of the rotor. Hence, the amplitude of vibration $d_r$ increases to a maximum at the middle of the core, since this is the place which is least affected by the restraining influence of the clamping rings.

As indicated by the stiffness formula above, stiffness is proportional to the modulus of elasticity E, which has a value of $30 \times 10^6$ for steel and which applies to solid steel clamping rings. On the other hand, the "effective" modulus of elasticity of a laminated core has been determined by various empirical methods involving frequency measurements and has been found to be around two-thirds of that of a solid steel member.

In accordance with the present invention, the end sections 8 of the core are constructed of grain-oriented material, while the major length of the midsection 9 is constructed of non-oriented material. Transition regions 10 located between sections 8 and 9 at opposite ends of the core are constructed of a mixture of these two materials, such as by selectively interleaving or alternating laminations of grain-oriented and non-oriented material.

It is known that non-oriented material has a higher effective modulus of elasticity E (hence greater stiffness) than does a grain-oriented material. The values of E for these two materials are subject to some dispute, according to the empirical methods used to determine them, but it is generally conceded that non-oriented material has an effective modulus E which is some 20 to 30 percent higher than that of grain-oriented material when in the laminated core configuration. Hence, the stiffness of the core midsection 9 is made greater than the stiffness of the core end sections 8 and the variations in stiffness along the core can be adjusted to the desired level by those skilled in the art by varying the lengths of sections 8, 9 and 10.

Increases in stiffness have two influences in reducing the amplitude of vibration. First, the amplitude $d_r$ is inversely proportional to stiffness S for a static deflecting force. Secondly, the natural frequency $f_n$ of the core as a vibrating member is increased in proportion to the square root of the stiffness as indicated in the following formula:

$$f_n = K' \sqrt{S/W}$$

where $K'$ is a constant and W is weight. Amplitude of vibration $d_r$ is proportional to the factor:

$$\frac{1}{1 - \left(\frac{f_0}{f_n}\right)^2}$$

where $f_o$ is the frequency of the magnetic pull of the rotor. For values of $f_n$ greater than $f_o$, increases in $f_n$ (due to increases in stiffness) will decrease this factor.

Hence, increases in modulus E at the midsection of the core (causing an increase in stiffness) will have a two-fold effect in reducing amplitude of vibrations $d_r$ in the center portion of the core. Yet, grain-oriented material can still be employed at the ends of the core, where increased flux carrying capability is required due to leakage flux from the end turns. The design, therefore, can be tailored to balance the magnetic advantages of grain-oriented material at the ends with the mechanical advantages of non-oriented material in the center of the machine.

The benefits of the invention may be achieved in two ways. First, the amplitudes of vibration at the center may be reduced so as to obtain more uniform vibrational amplitudes along the length of the core, thereby reducing problems with mounting the core to the frame. This reduced amplitude in the center is indicated at reference numeral 11a in the drawing.

The second design opportunity, assuming that the magnetic flux density levels are acceptable, is to reduce the overall diameter of a machine designed entirely of grain-oriented material by substituting non-oriented material at the midsection in accordance with the invention. Reductions in diameter reduce radius R and hence reduce the stiffness, in accordance with the stiffness formula. This will tend to increase vibration amplitudes along the entire length of the core. However, substitution of non-oriented material in the midsection, according to the present invention, enables the designer to then increase the stiffness in the midsection, so as to reduce amplitude there. By proper balance of reduced core diameter and use of non-oriented material in the midsection, the amplitude of vibration at the center of the redesigned machine need be no greater than its value prior to redesign.

While there has been described herein what is considered at present to be the preferred embodiment of the invention, other modifications will occur to those skilled in the art, and it is desired to secure in the appended claims all such modifications as fall within the true spirit and scope of the invention.

What is claimed is:

1. In a dynamoelectric machine including a rotor and a stator in which rotation of said rotor within said stator may cause mechanical distortion and vibration of said stator due to magnetic interaction between magnetic poles of said rotor and said stator, the improvement in a stator core including a plurality of laminated members of magnetic material mechanically fastened together to form a rigid cylindrical body, said improvement comprising:

a first plurality of laminated members at the longitudinal center of said core composed of magnetic material having a high modulus of elasticity but no preferential directional magnetic susceptibility, a second plurality of laminated members at either end of said core composed of magnetic material having a lower modulus of elasticity than that of said plurality of laminated members and a directional preferential magnetic susceptibility, and said composite core exhibiting a high degree of resistance to mechanical distortion and vibration at the longitudinal center thereof and a high degree of directionally preferential magnetic susceptibility at respective ends thereof in order to lessen said rotor mechanical vibration during operation.

2. The improvement of claim 1 wherein said first plurality of core laminated members are of non-grain oriented magnetic material and said second plurality of core laminated members are of grain oriented magnetic material.

3. The improvement of claim 2 wherein a transition region between said center-located first plurality of laminated members and said end-located second plurality of laminated members comprises alternating grain oriented and non-grain oriented laminated members.

* * * * *